H. & J. L. Young,
Diamond Saw.
No. 107,847.  Patented Sep. 27, 1870.
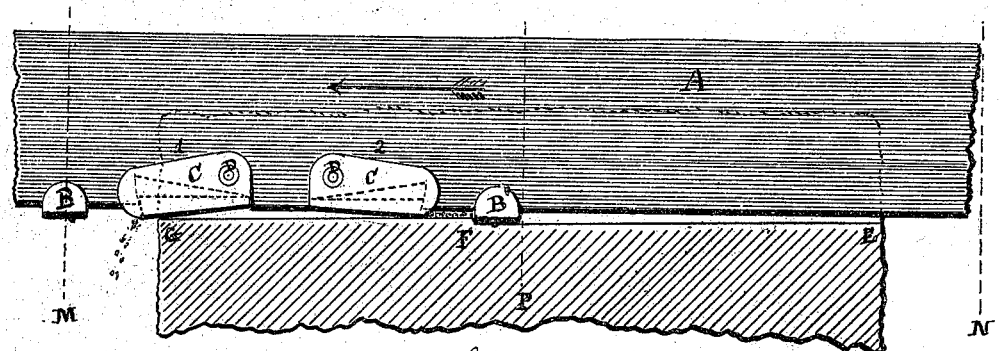
fig: 1.
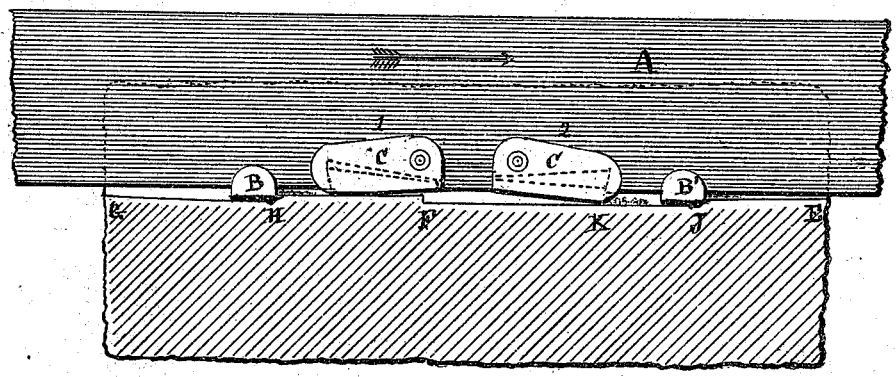
fig: 2.
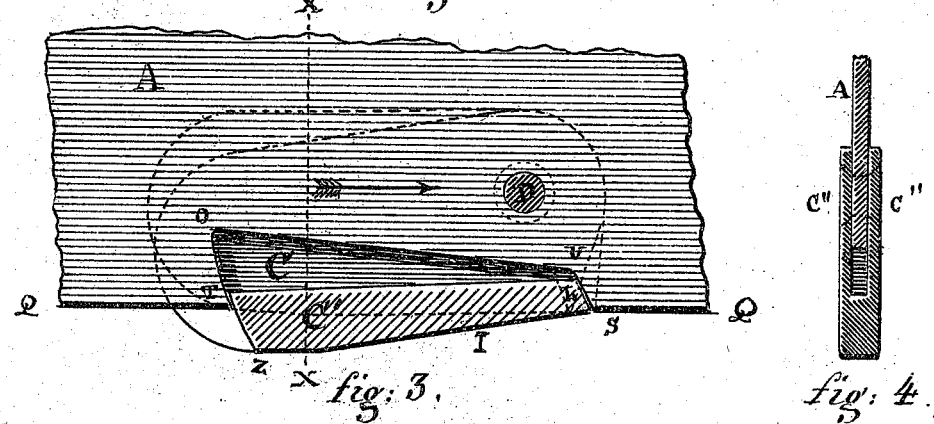
fig: 3.  fig: 4.
Witnesses:
Thom. E. Crasto
Frank P. Crasto
Inventors:
Hugh Young
James L. Young

United States Patent Office.

HUGH YOUNG, OF MIDDLETOWN, CONNECTICUT, AND JAMES L. YOUNG, OF NEW YORK, N. Y.

Letters Patent No. 107,847, dated September 27, 1870; antedated September 26, 1870

IMPROVEMENT IN MACHINES FOR CUTTING STONE.

The Schedule referred to in these Letters Patent and making part of the same.

We, HUGH YOUNG, of Middletown, in the county of Middlesex and State of Connecticut, and JAMES L. YOUNG, of New York, in the county and State of New York, have invented certain Improvements in Tools for Cutting Stone, of which the following is a specification.

Nature and Objects of the Invention.

In other applications for Letters Patent, which we have before the United States Patent Office, we have described a new mode of cutting stone by means and with the use of a tool, consisting of or protected by a diamond or cluster of diamonds, or other hard stones, such tool plowing its way right through the whole length of the cut to be made in the stone, and passing out at each end of said cut alternately.

The present invention relates to an improved cutting-tool, to be used in a similar manner and having for its object to provide a means whereby stones may be cut upon such a machine of greater length than it would be possible to cut on it if worked according to our former invention.

Our invention consists in the combination of two cutters with one blade, and of two debris-plows so arranged, each to the others, that one cutter will pass out at one end of the cut, followed by one debris-plow, with one stroke of the machine, and the other cutter will pass out at the other end of the cut, followed by the other debris-plow, with the opposite stroke of the machine, the action of the one cutter with its plow overlapping the action of the other cutter with its plow within the cut at some point between the two ends thereof.

Description of Drawing.

Figures 1 and 2 are front views of our improved tool for cutting stone, which we call a twin cutter-tool, shown in two different positions in a stone seen in sectional elevation through the cut therein;

Figure 3 is a view on a larger scale of the debris-plow of our improved twin cutter-tool, having one of its sides or cheeks removed, so as to show the shape of the bottom part of the cleft, and of part of the blade upon which the said debris-plow is mounted; and Figure 4 is a transversal sectional view of the same through the line X X.

General Description.

A is a blade or guiding-sheet, having a movement or stroke in the line of the cut to be made, as indicated by the arrows in our drawing, said movement having a length of stroke, as from M to P.

This blade A is mounted in any suitable machine, for working the same in proper relation to the stone to be cut.

B and B' are our twin cutters, which are each to consist of a diamond, or cluster of diamonds, or other hard stones, or of a tool protected by a diamond, or cluster of diamonds, or other hard stones, or of a tool protected by two distinct diamonds, or cluster of diamonds, or other hard stones, one of such distinct diamonds or clusters being arranged so as to cut in one direction, and the other of such distinct diamonds or clusters so as to cut in the other direction.

The twin cutters B and B' are fastened or hung to the blade A at a somewhat less distance from each other than the length of the stroke of the machine, and the stone is fed to the twin cutter-tool by any proper mode; but as the cutters plow or cut in both directions, and as each cutter only passes out at one end of the stone, and the debris formed by the inward transit of both cutters is pushed from either end to the center of said cut, it would soon choke the action of the tool.

To obviate this difficulty, we employ, in combination with our twin cutters B B', the two debris-plows $C^1$ and $C^2$, which may be made of any construction answering the purpose, but whose characteristic is that in entering the cut they will ride over the debris or other impediment, while in the other direction, or passing outward, they will push the debris before them and clear the cut.

We illustrate the simple mode of construction we now employ for the debris-plows of our twin cutter-tool, but many modifications may be made, and yet retain the characteristic above referred to.

C is the debris-plow, cleft so as to present two cheeks, C" C", and a solid part, C', at bottom.

The part C' is fitted into a notch, T O U S, in the blade A. The cheeks are made to straddle the said blade A, and the plow is hung or pivoted by a loose rivet or bolt, D, in an eccentric manner, as shown in our drawing, so that when the butt L of the piece C' will touch the part U S of the notch in the blade A the lower part of the plow, at Z, will project below the lower edge Q Q of the blade A sufficiently to allow it to act on the bottom of the cut and push before it the debris left in the cut by the action of the cutters.

There is left between the top part of the piece C' and the edge O U of the notch enough play to allow the said part C' to rise and enter into the notch T O U S; and when the plow is moving in the direction of the arrow, fig. 3, if any impediment or debris strike the part I, the plow can rise to the extent indicated by the dotted lines, and the edge I Z will ride over such impediment.

The two debris-plows $C^1$ and $C^2$ are located between the twin cutters B and B', and are turned away one from the other, as seen in our illustration, leaving sufficient distance between the end Z of the plow and the cutter B for the debris of one transit of the cutter to lodge without choking the tool.

In fig. 1 the plow C¹ has cleaned the cut of the debris made by the cutter B from G to F, and of the debris it may have left behind it in its passage from F to G; and the cutter B', in cutting from E to F, has made an accumulation of debris at F, the plow C² having ridden over the stone at bottom of the cut from E to F.

In fig. 2 the movement is reversed; the cutter B has reached the point H in its transit from G to F, and the plow C¹ is (passing inward) riding over the uncut stone; the cutter B' has reached the point J in its transit from F to E, and the plow C², being on its passage outward, is pushing the debris before it.

The feed of the stone is indicated by the lines at the bottom of the cut, the inclination being exaggerated to illustrate the action of the cutters and plows more strikingly.

Claims.

1. The improved tool for cutting stones, consisting of the combination of the twin cutters B B', the debris-plows C¹ and C², and the blade A, arranged so as to operate substantially in the manner and for the purpose set forth.

2. The debris-plow C, constructed so as to straddle and be hung to the blade A in such a manner as to plow through the cut and push before it any debris left in the said cut when moving outward, while in moving in the opposite direction it will ride over any such debris, or other impediment, substantially in the manner herein specified.

HUGH YOUNG.
JAMES L. YOUNG.

Witnesses:
MOSES E. CRASTO,
FRANK P. CRASTO.